US009262131B1

(12) United States Patent
Nolan

(10) Patent No.: US 9,262,131 B1
(45) Date of Patent: *Feb. 16, 2016

(54) SYSTEMS, METHODS AND MACHINE READABLE MEDIUMS FOR BATCH PROCESS STRAIGHT THROUGH MODELING

(71) Applicant: Misys Ireland Limited, Dublin (IE)

(72) Inventor: Ronnie Nolan, Dublin (IE)

(73) Assignee: Misys Ireland Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/487,062

(22) Filed: Sep. 15, 2014

Related U.S. Application Data

(63) Continuation of application No. 12/874,169, filed on Sep. 1, 2010, now Pat. No. 8,839,252.

(51) Int. Cl.
  *G06F 9/44* (2006.01)
  *G06F 9/48* (2006.01)
  *G06Q 10/06* (2012.01)
  *G06Q 30/00* (2012.01)
  *G06Q 40/00* (2012.01)

(52) U.S. Cl.
  CPC .. *G06F 8/34* (2013.01); *G06F 8/36* (2013.01); *G06F 9/4443* (2013.01); *G06F 9/48* (2013.01); *G06Q 10/0633* (2013.01); *G06Q 30/00* (2013.01); *G06Q 40/00* (2013.01)

(58) Field of Classification Search
  None
  See application file for complete search history.

(56) References Cited

U.S. PATENT DOCUMENTS

| | | | |
|---|---|---|---|
| 6,323,882 B1 | 11/2001 | Jerome et al. | |
| 6,640,238 B1 | 10/2003 | Bowman-Amuah | |
| 6,640,244 B1 | 10/2003 | Bowman-Amuah | |
| 8,839,252 B1 * | 9/2014 | Nolan | 718/101 |
| 2004/0078105 A1 | 4/2004 | Moon et al. | |
| 2004/0133439 A1 * | 7/2004 | Noetzold et al. | 705/1 |
| 2005/0149908 A1 | 7/2005 | Klianev | |
| 2006/0069717 A1 | 3/2006 | Mamou et al. | |
| 2006/0074730 A1 | 4/2006 | Shukla et al. | |
| 2006/0074737 A1 | 4/2006 | Shukla et al. | |
| 2007/0255651 A1 | 11/2007 | Egetoft | |
| 2007/0266051 A1 | 11/2007 | Moore | |
| 2008/0229314 A1 | 9/2008 | Hirose et al. | |
| 2009/0210433 A1 | 8/2009 | Werner et al. | |
| 2009/0307695 A1 * | 12/2009 | Chandnani | G06F 9/5027 718/101 |
| 2010/0005472 A1 * | 1/2010 | Krishnaraj | G06F 9/5038 718/104 |
| 2010/0036771 A1 | 2/2010 | Daniel et al. | |
| 2010/0162211 A1 | 6/2010 | Ostrovsky et al. | |

(Continued)

Primary Examiner — Emerson Puente
Assistant Examiner — Benjamin Wu
(74) Attorney, Agent, or Firm — Sheppard Mullin Richter & Hampton LLP

(57) ABSTRACT

Systems, methods and machine-readable mediums for batch process straight through modeling are provided. The systems may include a storage device and a processor. The storage device may store at least one batch process model. The processor may be programmed to display a graphical user interface for graphically defining the batch process model with at least one flowchart, and receive a selection of at least one activity step for inclusion in the at least one flowchart, each activity step corresponding to a predefined execution logic. The processor may be also programmed to determine the batch process model from the at least one activity step selected, and display the at least one activity step in the at least one flowchart.

13 Claims, 17 Drawing Sheets

(56) References Cited

U.S. PATENT DOCUMENTS

| | | |
|---|---|---|
| 2010/0162245 A1 | 6/2010 | Plancarte et al. |
| 2011/0016354 A1 | 1/2011 | Douros et al. |
| 2011/0208872 A1 | 8/2011 | Liddell et al. |
| 2012/0030094 A1* | 2/2012 | Khalil .......................... 705/39 |
| 2012/0095925 A1 | 4/2012 | Agarwal et al. |

* cited by examiner

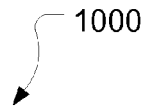

Batch Process Model

Name of Batch Process

An Activity Step Descriptor with Input Tags for the following properties populated with default values given by the user Multi-node operation indicator Number of concurrent Threads to use Number of jobs per Database Transaction The Database statement to select the required data set Contention Context data Pre-process execution model Process execution model Post-process execution model Data items that are accumulated during process execution

Figure 10

Process Execution Model

List of Activity Steps and their order

List of input and output data per Activity Step

Mapping rules between Activity Steps

SYSTEMS, METHODS AND MACHINE READABLE MEDIUMS FOR BATCH PROCESS STRAIGHT THROUGH MODELING

PRIORITY

This application is a continuation of U.S. Non-Provisional patent application Ser. No. 12/874,169, filed Sep. 1, 2010, which is hereby incorporated by reference in its entirety.

FIELD

This disclosure relates generally to batch processes and more specifically to systems, methods and machine readable mediums for batch process straight through modeling.

BACKGROUND

A batch process may perform a list of commands. It may be run by a computer's operating system using a batch file, or may be executed within a program using a macro or internal scripting tool. A program takes a set of data files as input, processes the data, and produces a set of output data files. This operating environment is termed as "batch processing" because the input data are collected into batches on files and are processed in batches by the program.

An example of batch processing is the way that credit card companies process their billing. A customer does not receive a bill for each separate credit card purchase transaction, but rather one monthly bill for all of that month's purchases. The bill is created through batch processing, where all of the data are collected and held until the bill is processed as a batch at the end of a billing cycle.

SUMMARY

Systems, methods and machine-readable mediums for batch process straight through modeling are provided. The systems may include a storage device and a processor. The storage device may store a batch process model. The processor may be programmed to display a graphical user interface for graphically defining the batch process model with at least one flowchart, and receive a selection of at least one activity step for inclusion in the at least one flowchart, each activity step corresponding to a predefined execution logic. The processor may be further programmed to determine the batch process model from the at least one activity step selected, and display the at least one activity step in the at least one flowchart.

In one embodiment, the at least one flowchart includes a pre-process flowchart for batch pre-processing, a process flowchart for batch processing, and a post-process flowchart for batch post-processing. The processor may be further programmed to transform the batch process model into an executable code.

In one embodiment, the processor may be further programmed to retrieve a batch data from the storage device, divide the batch data into a plurality of subset data for processing, and execute, in parallel, the executable code of the batch process model on a plurality of processor threads, each processor thread processing one of the plurality of subset data. The processor may be programmed to display a connector, in the at least one flowchart, to connect a first activity step from the at least one activity step to a second activity step from the at least one activity step. Also, the processor may be further programmed to display a palette having an image associated with each activity step, prior to receiving a selection of at least one activity step.

The computer readable mediums provide instructions to cause the processor to perform the operations above.

Many other and additional features and embodiments of the present invention will be apparent from the accompanying drawings and from the following detailed description.

DRAWINGS

The embodiments are illustrated by way of example and not limitation in the figures of the accompanying drawings in which like references indicate similar elements.

FIG. 10 illustrates an exemplary batch process model, according to an embodiment of the present disclosure.

DETAILED DESCRIPTION

Figure 1:
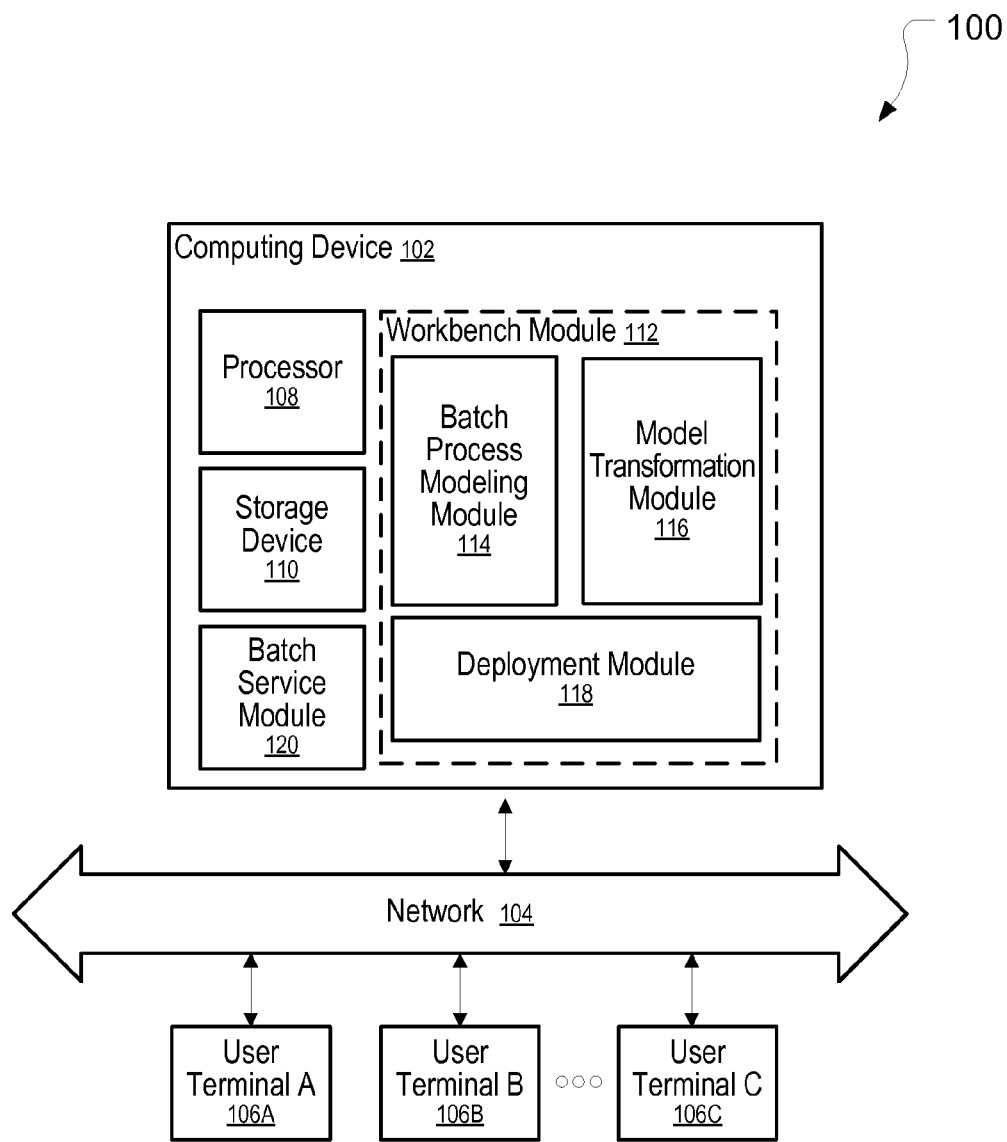
FIG. 1 illustrates an exemplary block diagram of a data processing system for batch process straight through modeling, according to one embodiment of the present disclosure.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment, and such references mean at least one.

The use of headings herein are merely provided for ease of reference and shall not be interpreted in any way to limit this disclosure or the following claims.

In the description that follows, the present disclosure may be described in reference to one or more embodiments for batch process straight through modeling. The present inventions, however, are not limited to any particular application nor is it limited by the examples described below. Various modifications to the disclosed embodiments may be apparent to those skilled in the art and the general principles defined herein may be applied to other embodiments and applications without departing from the spirit and scope of the inventions. Therefore, the description of the embodiments that follow are for purposes of illustration and not limitation.

Reference in this specification to "one embodiment", "an embodiment", "other embodiments", or the like means that a particular feature, structure, or characteristic described in connection with the embodiment is included in at least one embodiment of the disclosure. The appearances of, for example, the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Systems, methods and machine-readable mediums for batch process straight through modeling are provided. In one embodiment, the systems, the computer-implemented methods and the machine readable mediums provide the tools and execution environment to enable software application designers and developers to model parts of their application that may require repeated processing of large volumes of data without manual intervention, known as batch processing, and submit it for execution without the need for further development in a programming language. In the financial industry, batch processing may be applied, for example, for use in the following functional batch service areas: Limits Revaluation, Account Statement Production, Balance Sheet Collection, Branch System Extract and Download, Bulk Transaction Postings, Customer Charges Accrual, Customer Charges Application, Card System Balance Extract and Download, Collateral Revaluation, Account Delinquency Identification, Account Dormancy Indication, Interest Accrual Calculation, Interest Application, Interest History Recalculation, Interest Rate Change Application, Loan Arrears Calculation, Profit and Loss Collection, Loan Repayment Collection, Retained Earnings Collection, ATM Balance Download, Standing Order Processing, Foreign Exchange (FX) Premium Discount Accrual Calculation, FX Swaps Amortization, FX Profit and Loss, FX Revaluation and FX Positions Profit and Loss.

In one embodiment, the present invention may be employed or applied for the foregoing functional batch service areas. In one embodiment, the present invention may be employed or applied for any functional batch service areas, including but not limited to those expressly identified and other functional batch service areas in the financial industry. In one embodiment, the present invention may be employed or applied for functional batch service areas relevant to industries other than the financial industry.

Prior art solutions may require extensive work to manually program batch processes in a programming language. This leaves these systems' batch processing open to quality issues because of the potential deviation from the defined model through the manual programming effort and the likelihood of a fragmented development environment between the modelling tools and the programming tools. This approach also leaves such solutions open to cost issues due to the necessary shift from modelling to programming across different tools and people.

The present disclosure provides the capability to model all aspects of a batch process in a single tooling environment and transform the model to a form that will execute in conjunction with a batch service without the need for manual programming effort. The result is quicker time to market and improved quality. This may be achieved by the use of a runtime infrastructure, specifically the batch service, and a set of artefact types called batch process component artefacts, as well as the tools to construct and deploy these. The combination of these artefact types, created by an application developer using the tooling within a workbench module, constitutes the model of the batch process. In one embodiment, straight through modelling is the process and system of creating a model that is transformable for immediate execution without the need for manual intervention through programming. The above-mentioned and other features of the present disclosure will become more apparent in the following description.

FIG. 1 illustrates an exemplary block diagram of a data processing system 100 for batch process straight through modeling, according to one embodiment of the present disclosure. The system 100 may include at least one computing device 102, and at least one user terminal 106A-C. The components of the system 100 may be distributed over a network 104. In one embodiment, the network 104 may include a local area network, a cellular telecommunications network, a wireless wide area network, a wireless local area network, a wireless personal area network, an intranet, or internet, or a combination thereof. For example, the components of the system 100 may be selectively distributed over the Internet as well as maintained within an intranet of an organization. In one embodiment, the user terminal 106 may run commercially-available Web browser applications such as Microsoft Internet Explorer®, which implements World Wide Web standards such as HTTP, HTML, XML, Java, Flex, Ajax and the like.

In one embodiment, the computing device 102 may include at least one processor 108, one or more modules and one or more databases. For example, the computing device 102 may include a storage device 110, a workbench module 112 and a batch service module 120. In one embodiment, the at least one processor 108 may be a commercially-available processor which accesses data from the storage device 110 and/or dynamically generates Web pages in response to end user actions. The Web pages may be in the form of HTML pages or the like. For example, the Web pages generated may be used to facilitate visual modeling, and execution of batch data, as discussed further below.

In one embodiment, data of the storage device 110 can be provided either locally to the computing device 102 or remotely over the network 104. External data from an external storage device can be provided to the processor 108 in any standardized form which the processor 108 can understand. For example, an external storage device at a provider can advantageously provide batch data in response to requests from the processor 108 in a standard format, which the processor 108 may then transform into a function call format that code module(s) of the computing device 102 can understand. In one embodiment, the processor 108 may be a standard SQL server, where dynamic requests from the server builds forms from one or more databases used by the computing device 102 as well as stores and retrieves related data on the storage device 110.

The storage device 110 may be used to store, arrange and retrieve batch data for processing during batch process execution. In one embodiment, the storage device 110 may also be used to store, arrange and retrieve a set of artefact types called batch process component artefacts. Batch process component artefacts are the parts of any given batch process that constitute the model that defines it and parts that are executed at runtime.

The storage device 110 may be a machine-readable medium, which may be any mechanism that provides (i.e. stores and/or transmits) information in a form readable by a processor. For example, the machine-readable medium may be a read only memory (ROM), a random access memory (RAM), a cache, a hard disk drive, a floppy disk drive, a magnetic disk storage media, an optical storage media, a flash memory device or any other device capable of storing information. Additionally, machine-readable medium may also comprise computer storage media and communication media. Machine-readable medium includes volatile and non-volatile, removable and non-removable media implemented in any method or technology for storage of information such as computer-readable instructions, data structures, program modules or other data. Machine-readable medium also includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by a computer.

Figure 12:
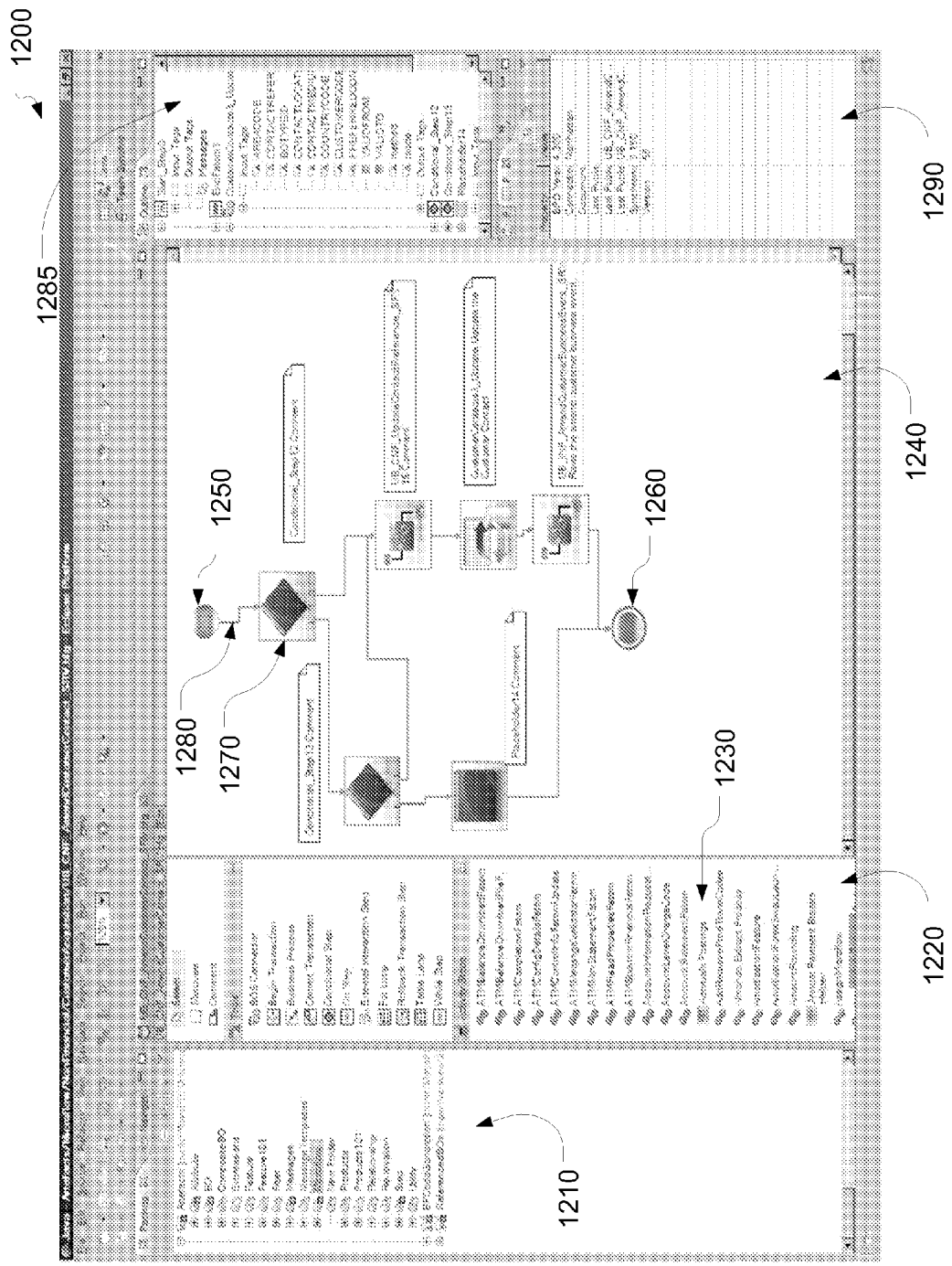
FIG. 12 illustrates a graphical user interface for editing execution logic, according to an embodiment of the present disclosure.

The workbench module 112 may be used to design an executable runtime batch process model. The batch process model contains all the information necessary to describe the functional capabilities of any particular batch process as well as all the information required to generate its executable form. In one embodiment, the workbench module 112 may include a batch process modeling module 114, a model transformation module 116 and a deployment module 118. The batch process modeling module 114 may be used to develop a batch process model using a graphical user interface, as illustrated in FIG. 12. The graphical user interface provides flowcharting-type functionality. A flowchart may be used to define pre-processing, processing and post-processing parameters of the batch process model. The flowcharts may be stored and retrieved from the storage device 110 and invoked when a user, of the computing device 102, selects an image corresponding to the flowchart on the graphical user interface.

The model transformation module 116 may be operatively associated with the batch process modeling module 114 to transform the batch process model into an executable form. For example, the model transformation module 116 may generate the batch process model into programming language, such as a Java format. In one embodiment, the deployment module 118 may be operatively associated with the model transformation module 116 to deploy and store the generated executable Java code in an artefact model repository, such as storage device 110.

As used herein, the term "module" refers to logic embodied in hardware or firmware, or to a collection of software instructions, possibly having entry and exit points, written in a programming language, such as, for example, C++. A software module may be compiled and linked into an executable program, or installed in a dynamic link library, or may be written in an interpretive language such as BASIC. It will be appreciated that software modules may be callable from other modules, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays. In one embodiment, the modules described herein may be implemented as software modules, but, in other embodiments, could be represented in hardware or firmware.

In one embodiment, each module is provided as a modular code object, where the code objects typically interact through a set of standardized function calls. In one embodiment, the code objects are written in a suitable software language such as C++, but the code objects can be written in any low level or high level language. In one embodiment, the code modules are implemented in C++ and compiled on a computer running a content server, such as, for example, Microsoft® IIS or Linux® Apache. Alternatively, the code modules can be compiled with their own front end on a kiosk, or can be compiled on a cluster of server machines serving interactive television content through a cable, packet, telephone, satellite, or other telecommunications network. Artisans of skill in the art will recognize that any number of implementations, including code implementations directly to hardware, are also possible.

In one embodiment, the computing device 102 may further include a batch service module 120. The batch service module 120 may be responsive to a user batch process selection. The batch service module 120 may then retrieve the executable code (e.g. Java) from the storage device 110 for execution. In one embodiment, the processor 108 may be used to execute the Java code for the selected batch process model.

Figure 2:
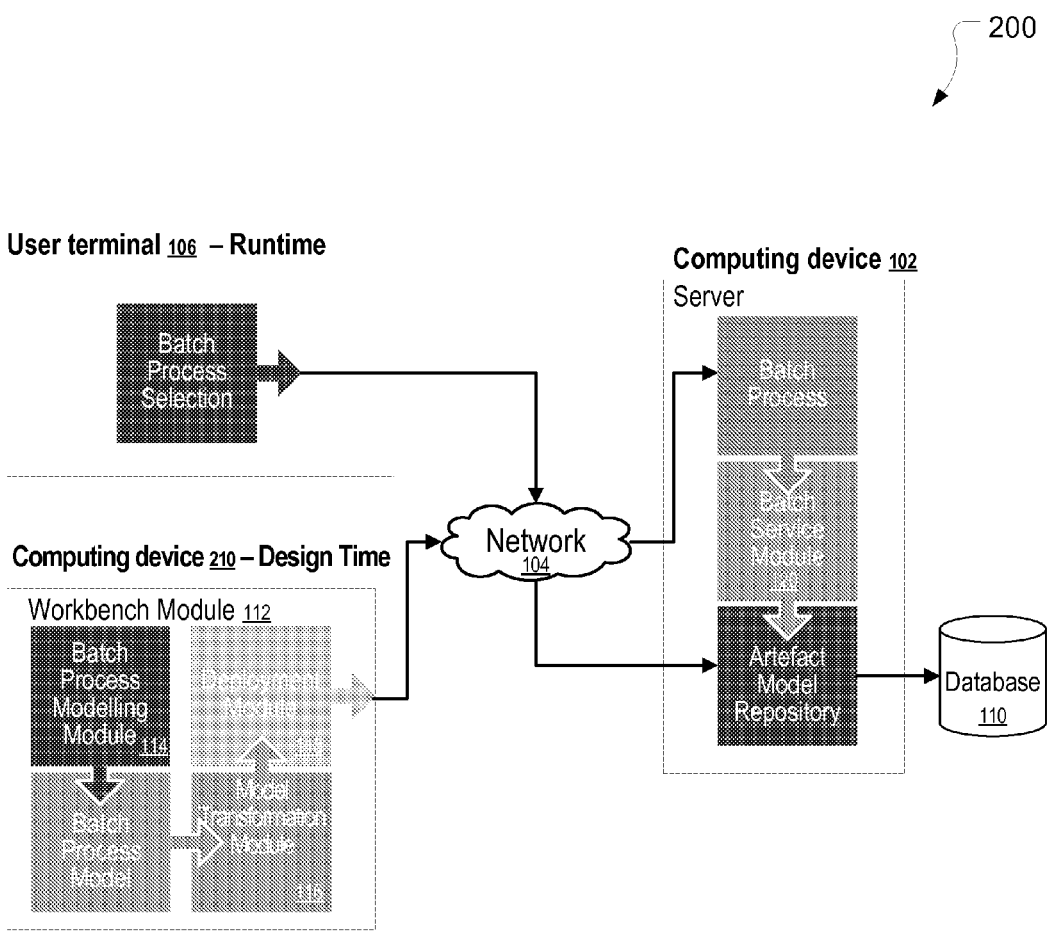
FIG. 2 illustrates another exemplary block diagram of data processing system for batch process straight through modeling, according to one embodiment of the present disclosure.

FIG. 2 illustrates another exemplary block diagram 200 of data processing system 100 for batch process straight through modeling, according to one embodiment of the present disclosure. As shown in FIG. 2, the workbench module 112 may be integrated with a second computing device 210 that is coupled to computing device 102 via the network 104. In this example, the batch process modeling/design may be done remotely from the computing device 210. The workbench module 112 may include a batch process modeling module 114, which may be used to develop a batch process model that is transformed to an executable code via the model transformation module 116 and deployed, over the network 104, to the artefact model repository via the deployment module 118. The artefact model repository is a module that permits the storage and retrieval of artefacts that comprise any particular model, either in original form or in executable form. When a user at user terminal 106 selects a batch process to execute, the selection is transmitted over the network 104 to the computing device 102 to initiate the batch process. The batch service module of the computing device 102 retrieves the executable code of the batch process model from the artefact model repository in database 110 and executes the code to perform the desired batch processing functionality.

In one embodiment, the computing device 102, the user terminal 106, and the computing device 210 may have different users. In one embodiment, the computing device 102, the user terminal 106, and the computing device 210 may have the same user.

Figure 3:
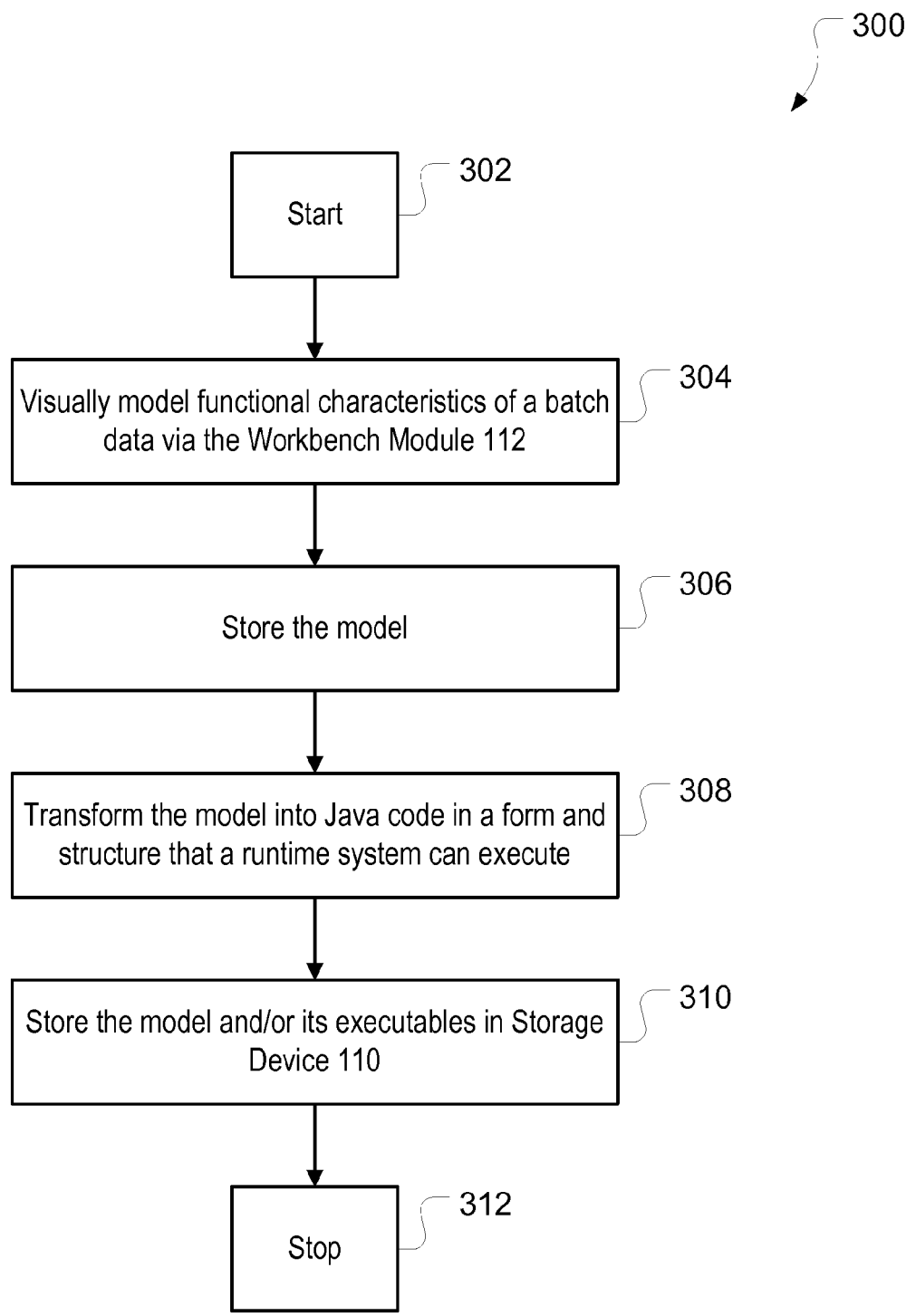
FIG. 3 illustrates an exemplary flowchart outlining the operation of the workbench module of FIG. 1, according to an embodiment of the present disclosure.

FIG. 3 illustrates an exemplary flowchart 300 outlining the operation of the workbench module 112 of FIG. 1, according to an embodiment of the present disclosure. The workbench module 112 may initiate (302) batch process design and visually model functional characteristics of a batch process (304). The model may then be stored in the storage device 110 (306). Next, the workbench module 112 may be configured to transform the model into Java code or any other programming language, form and structure, that a runtime system can execute (308). Next, the workbench module 112 may transmit the model and/or the executables for storage in the storage device 110 (310) and complete the batch process design (312).

Figure 4:
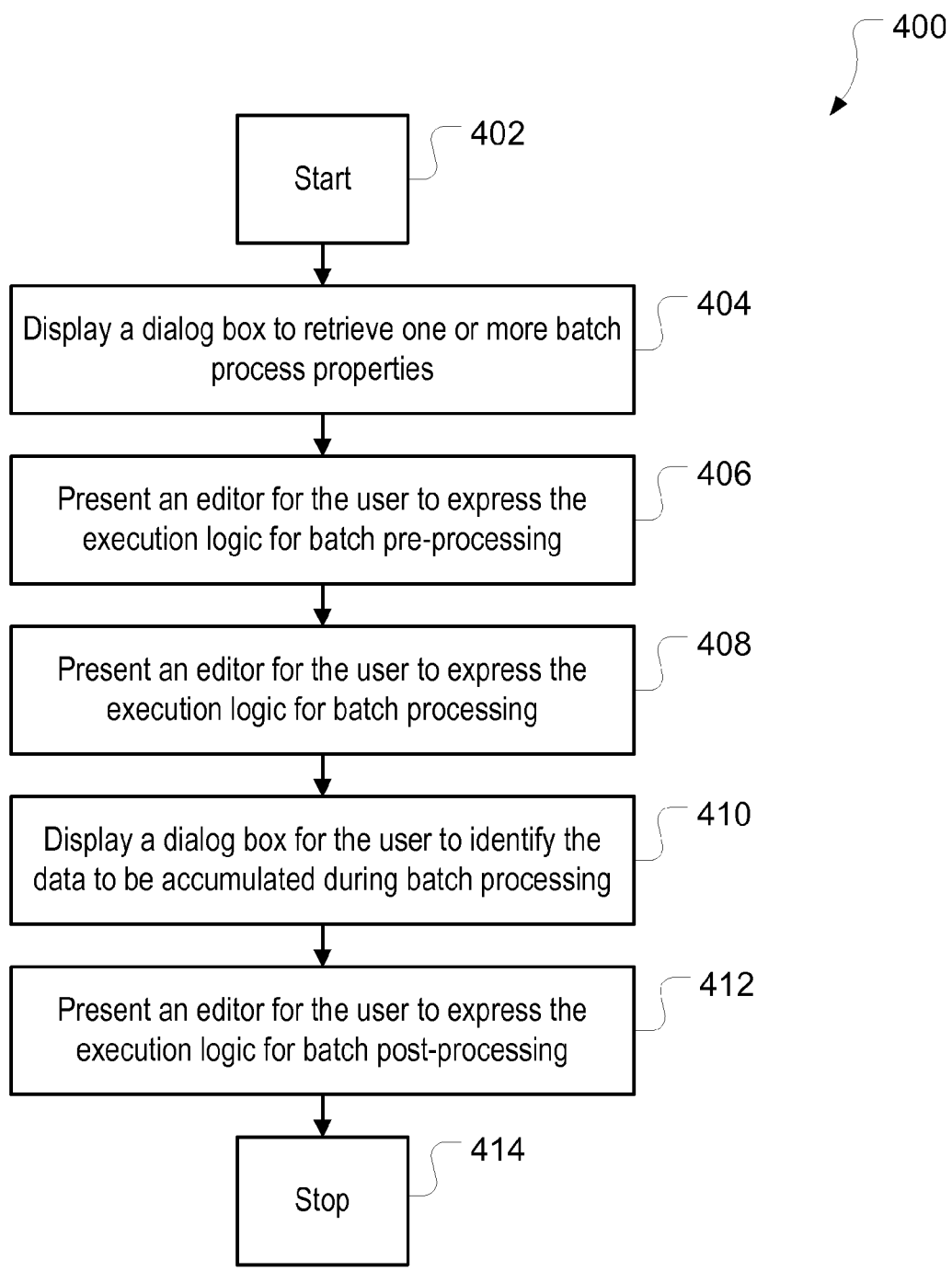
FIG. 4 illustrates an exemplary flowchart outlining the operation of the batch process modeling module of FIG. 1, according to an embodiment of the present disclosure.

FIG. 4 illustrates an exemplary flowchart 400 outlining the operation of the batch process modeling module 114 of FIG. 1, according to an embodiment of the present disclosure. The batch process modeling module 114 may be used to visually model the functional characteristics of a batch process, as illustrated in Step 304 of FIG. 3. The batch process modeling module 114 may initiate (402) batch process modeling and display a graphical user interface, such as a dialog box, to retrieve one or more batch process properties (404). Batch process properties may be any information needed about the batch process for modeling and may include runtime properties. For example, the batch process properties may include, but are not limited to, name, multi-node operation information, number of threads, number of jobs per transaction, dataset select query, and contention context. Next, the batch process modeling module 114 may be programmed to present a graphical user interface, such as an editor illustrated in FIG. 12, for the user to express the execution logic for batch pre-processing (406) and batch processing (408).

A dialog box may then be displayed for the user to identify the data to be accumulated during batch processing (410). A large data set may be broken down into a collection of subsets to be processed individually. The individual subsets may be executed in parallel, and in such instance, a batch model output may include the identification of the data to accumulate across all of the subsets. As such, the user may be prompted to identify the data that may be accumulated during batch processing. For example, in a balance sheet collection process, to determine the total amount against a given Balance Sheet line item, a user may select to accumulate the cleared balance and the book balance of the accounts that belong to that line item. Next, the batch process modeling module 114 may be programmed to present an editor for the user to express the execution logic for batch post-processing (412). At this point, the batch process modeling is complete (414). The model may then be stored in the storage device 110.

Figure 5:
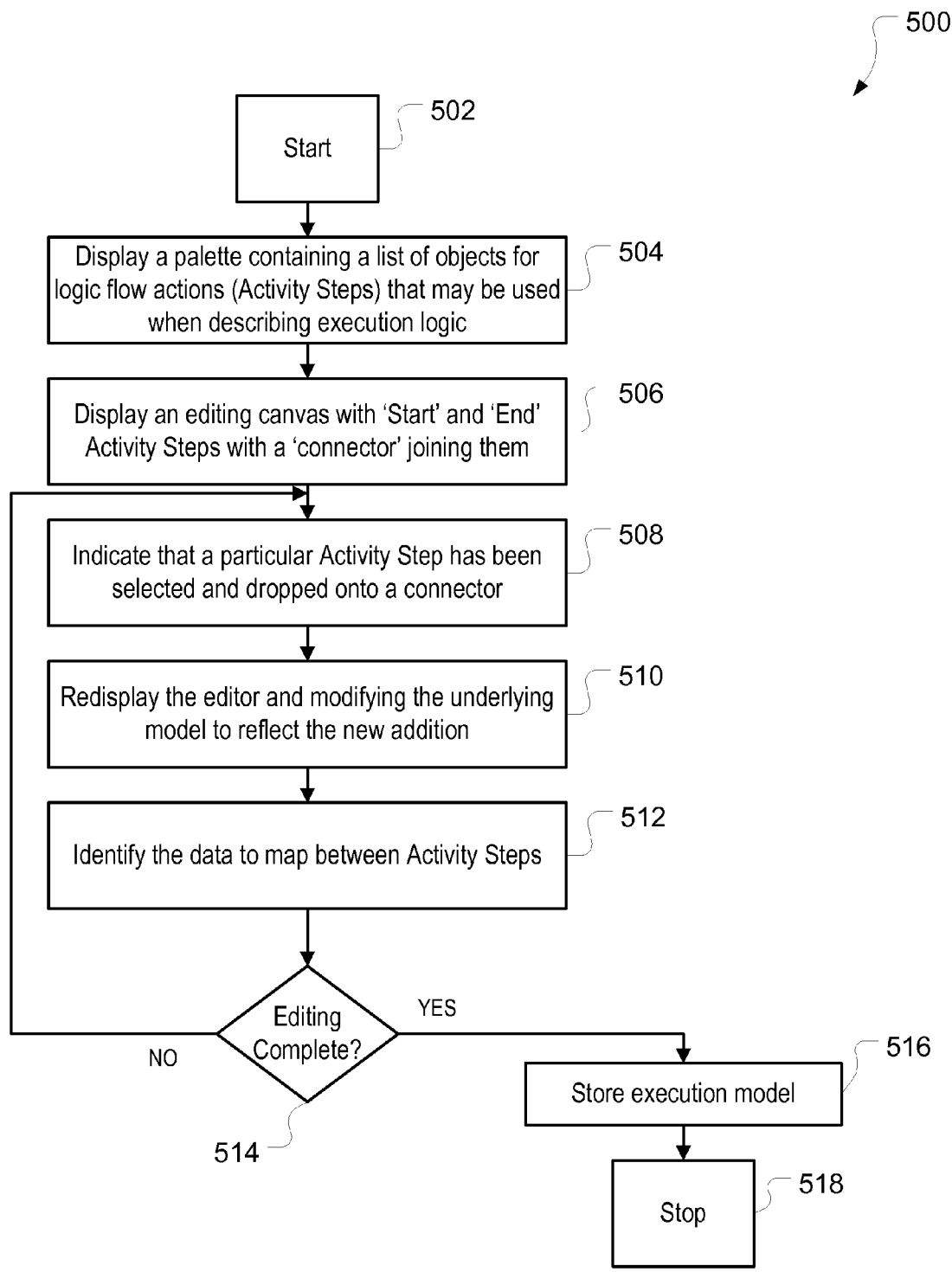
FIG. 5 illustrates an exemplary flowchart outlining the operation of the batch process modeling module for editing execution logic of batch pre-processing, batch processing, and batch post-processing, according to an embodiment of the present disclosure.

FIG. 5 illustrates an exemplary flowchart 500 outlining the operation of the batch process modeling module 114 for editing execution logic of batch pre-processing, batch processing, and batch post-processing, according to an embodiment of the present disclosure. The batch pre-processing, batch processing, and batch post-processing may all require the same basic flowcharting capability but for a different function or purpose. The batch process modeling module 114 may provide a graphical user interface, such as the editor illustrated in FIG. 12, that starts (502) the editing of execution logic by displaying a palette containing a list of images/objects. Each image/object may correspond to logic flow actions (activity steps) that may be used when describing execution logic (504). As illustrated in FIG. 12, the list of images/objects may correspond, but not be limited to, a loop, a conditional step, a call command to a process, a call command to a database query, a call command to send or receive a message, and other activity steps.

Next, the graphical user interface may display an editing canvas with "Start" and "End" activity steps with a connector joining them (506). The graphical user interface allows the user to graphically outline the functional activity steps of the batch process in a flowchart representation, beginning the flowchart with a "Start" image and stopping with an "End" image. The batch process modeling module 114 may be programmed to receive a particular activity step selection, displayed for example in the list of images/objects in the palette, and displaying the activity step in the editing canvas onto a connector between the "Start" and "End" activity steps. As can be appreciated, the images displayed on the editing canvas may correspond and invoke functional execution logic. The graphical user interface may allow a user to drag and drop activity steps, on the editing canvas, at a connector between any two existing activity steps on the editing canvas, and such actions are accordingly indicated by the batch process modeling module 114 (508). This allows the user to graphically or visually define the execution logic. Next, the batch process modeling module 114 may be programmed to redisplay the editor and modify the underlying model to reflect any newly added activity steps (510). As can be appreciated, it may also be possible that between any two activity steps, the user may want to map data further on, so therefore the output from one step might be used as an input to a subsequent step. As such, the batch process modeling module 114 may be programmed to identify the data to map between activity steps (512).

In one embodiment, the batch process modeling module 114 may be programmed to query if editing execution logic is complete (514). If editing is incomplete, the process continues to loop back to step 508 until editing process is complete. The batch process modeling module 114 may then store the execution model (516) and ends the operation (518). In one embodiment, this operation may be performed for all or some of batch pre-processing, batch processing, and batch post-processing.

Figure 6:
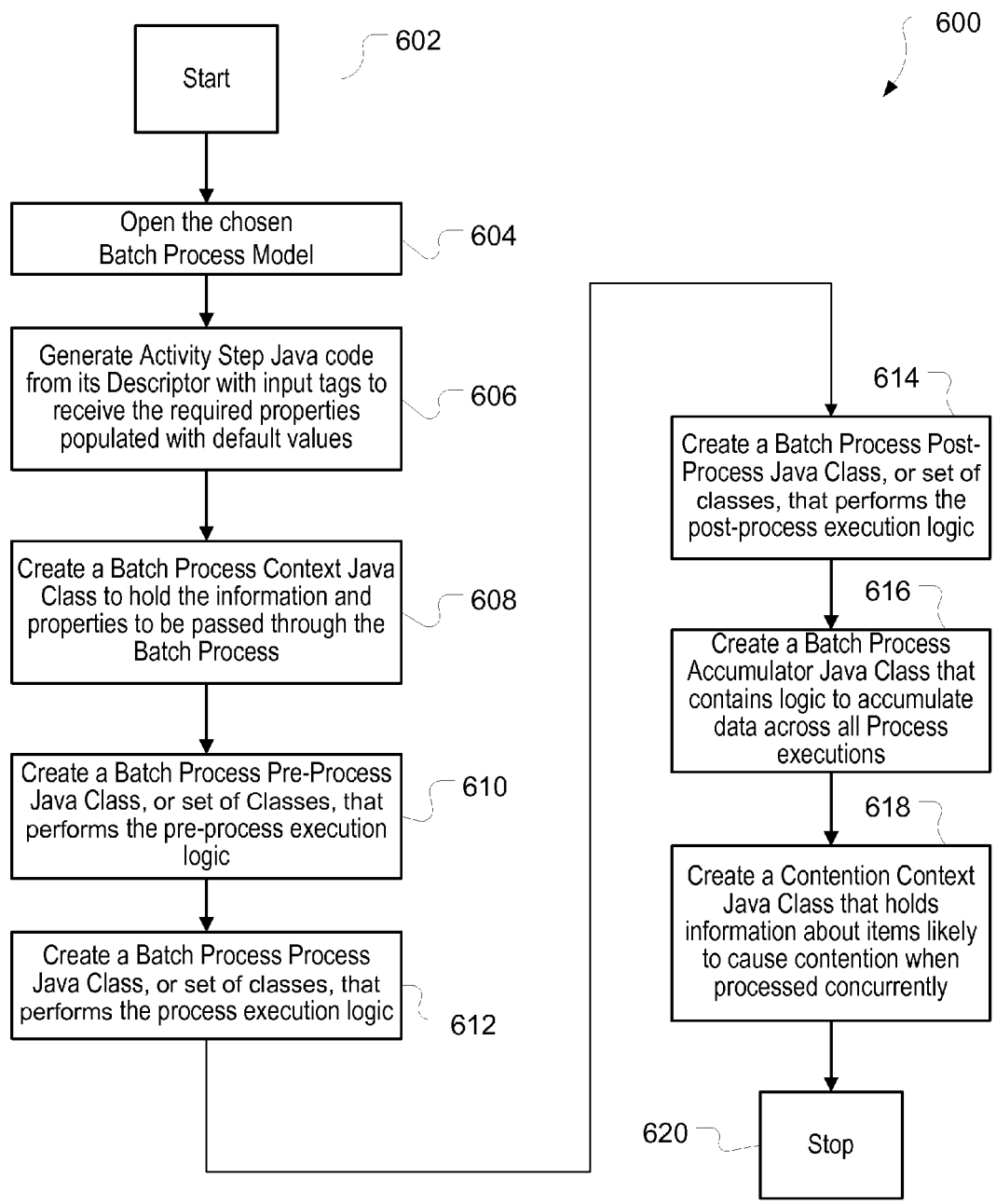
FIG. 6 illustrates an exemplary flowchart outlining the operation of the model transformation module of FIG. 1, according to an embodiment of the present disclosure.

FIG. 6 illustrates an exemplary flowchart 600 outlining the operation of the model transformation module 116 of FIG. 1, according to an embodiment of the present disclosure. The model transformation module 116 may be used to convert a certain batch process model defined, by the batch process modeling module 114, into an executable code. The model transformation module 116 may start operation (602) and open the certain batch process model (604) and generate activity step Java code from its descriptor with input values for the defined properties (606). As shown in FIG. 10, the defined properties for the batch process model may include multi-nodes, number of concurrent threads, number of jobs per database transaction, and the like. Next, the model transformation module 116 may create a batch process context Java class to hold any information and properties that would pass through the batch process (608). In one embodiment, every batch process class that is executing includes context information, the batch name, the number of threads and the like, as shown in FIG. 10.

Next, the model transformation module 116 may create a batch process pre-process Java class, or set of classes, that performs a pre-process execution logic (610). The model transformation module 116 may also create a process Java class, or set of classes, that performs a process execution logic (612) and a post-process Java class, or set of classes, that performs a post-process execution logic (614). In one embodiment, the model transformation module 116 may create a batch process accumulator Java class that contains logic to accumulate data across all process executions (616).

In one embodiment, the model transformation module 116 may create a contention context Java class that holds information about items likely to cause contention when processed concurrently (618), and then ends operation (620). The contention context Java class may be used to manage contention. For example, in a large volume batch process, the posting of multiple transactions to the same account may cause contention. Although the functionality of a batch process execution may be broken up and spread across a plurality of processors 108, the batch process execution may still operate out of a single database. If two or more processors 108 are trying to update the one account at the same time, contention may occur. Hence, the contention context Java class allows the capability to identify those likely to cause contention and treat them differently during the updates. So, when individual subsets are being processed in parallel, once the system recognizes something of a highly contentious nature, the contention context Java class will gather all the updates for those together and process those updates sequentially.

In one embodiment, the Java classes that are created by the model transformation module 116, are created according to a batch service framework, and may be processed via the batch service module 120. As noted earlier, programming languages, other than Java, may also be used with the inventions disclosed herein.

Figure 7:
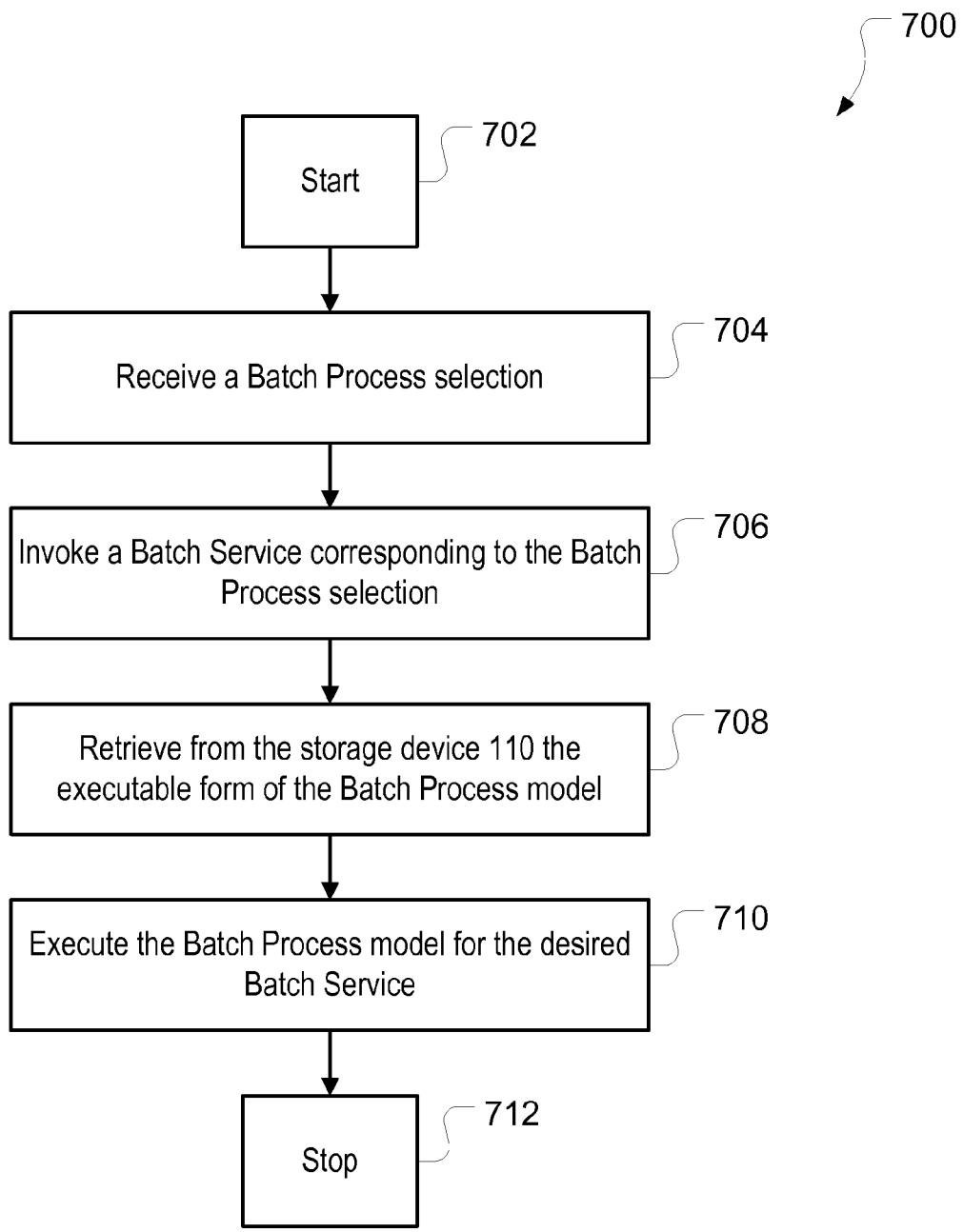
FIG. 7 illustrates an exemplary flowchart outlining the invocation of a batch process, according to an embodiment of the present disclosure.

FIG. 7 illustrates an exemplary flowchart 700 outlining the invocation of a batch process, according to an embodiment of the present disclosure. The batch service module 120 may start operation (702) when a batch process selection is received from a user terminal 106 across the network 104 (704). The batch service module 120 may then invoke a batch service corresponding to the batch process selection (706) by retrieving from the storage device 110 the executable form of the batch process model (708). In one embodiment, the batch service module 120 may then execute the batch process model for the desired batch service (710) and outputs a batch process execution model and ends the operation (712).

Figure 8:
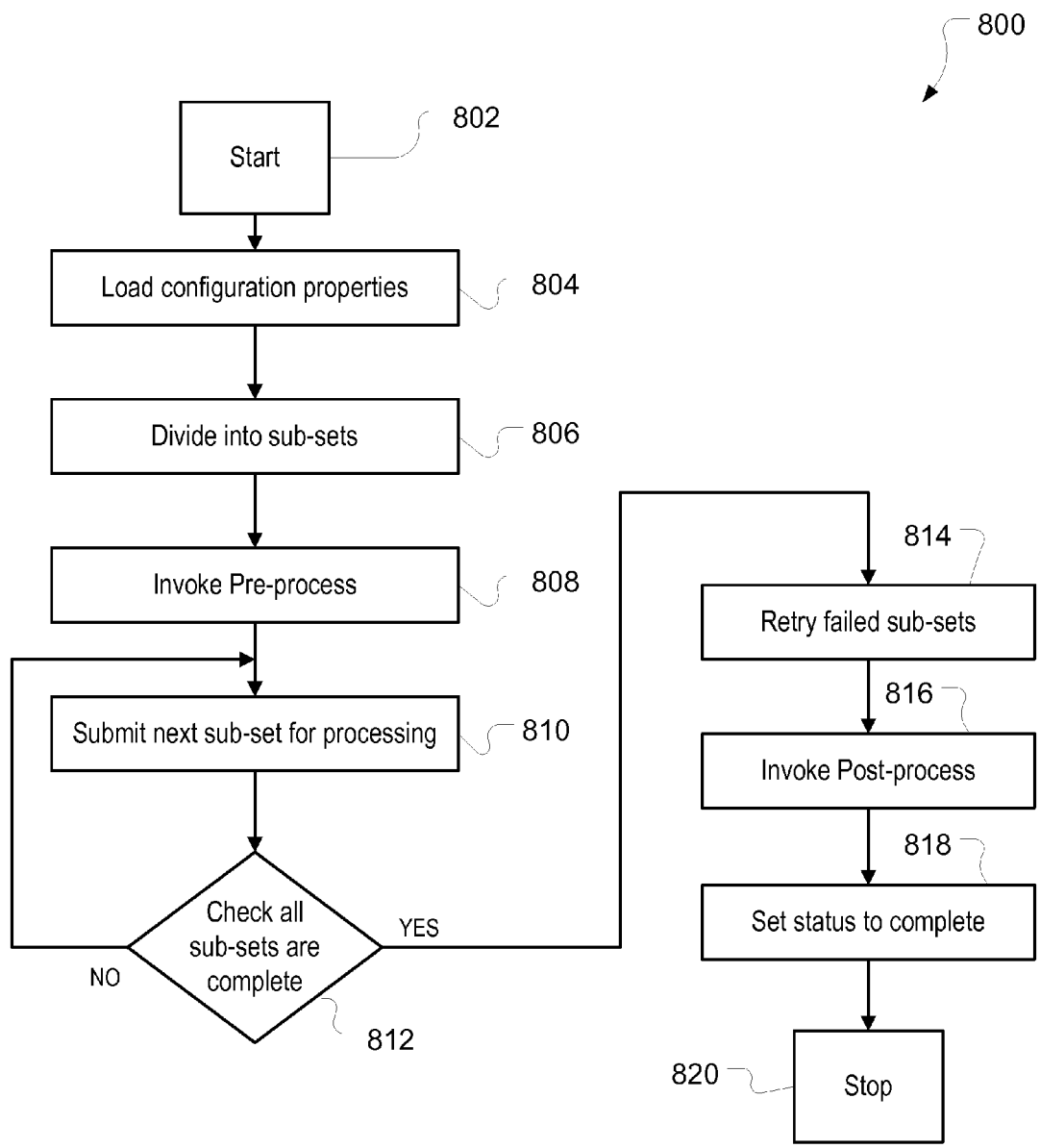
FIG. 8 illustrates an exemplary flowchart outlining the operation of the batch service module of FIG. 1, according to an embodiment of the present disclosure.

FIG. 8 illustrates an exemplary flowchart 800 outlining the operation of the batch service module 120 of FIG. 1, according to an embodiment of the present disclosure. The batch service module 120 may start operation (802) by loading or reading configuration properties of a batch (804). For example, the properties may include, but not limited to, the number of subsets to process concurrently, or the number of data elements to include in a single subset. The properties may be loaded from a set of input parameters of an Activity Step that has been created, thus incorporating those properties that are listed in the Batch Process Model, as shown in FIG. 10. The subset may be a part of the overall data that would be processed as a single unit. For example, a subset may correspond to one or more individual accounts of a customer of an entity that implements the data processing system 100. Next, the batch service module 120 may logically divide the data into subsets (806). In one embodiment, the batch service module 120 may invoke pre-process functionality (808). For example, pre-process functionality may be invoked when determining interest accrual or balance sheets in order to initialize values to be accumulated throughout the batch process. Next, the batch service module 120 may submit or forward each subset for processing with one or more processors 108 (810). In one embodiment, the batch service module 120 may submit each subset for parallel processing across one or more processors 108 and one or more threads.

Figure 9:
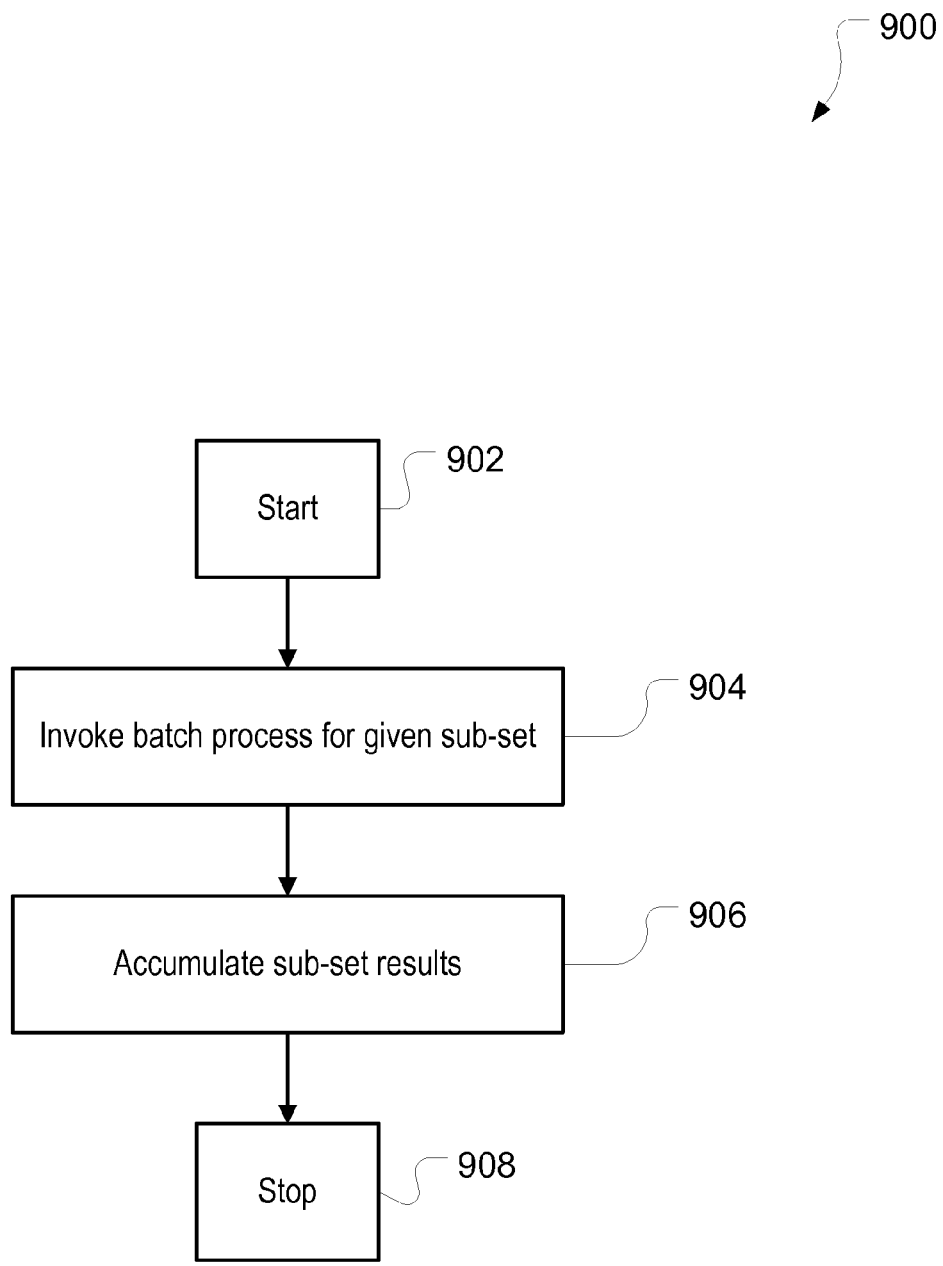
FIG. 9 illustrates an exemplary flowchart outlining the operation of a processor for processing a given subset, according to an embodiment of the present disclosure.

As shown in FIG. 9, the exemplary flowchart 900 outlines the operation of processor 108 for processing a given subset. In one embodiment, the Batch Service Module 120 invokes the processor 108 to process the given subset. The processor 108 starts operation (902) by invoking a batch process for a given subset (904). In one embodiment, the processor 108 may then accumulate the subset results for storage in storage device 110 (906) and ends the operation (908). In one embodiment, the operation may process a page or other type of subset.

Referring back to FIG. 8, the batch service module 120 may be programmed with instructions to check if all subsets are processed to completion (812). If not, the batch service module 120 submits the next subset for processing and checks thereafter if all subsets are processed to completion in a closed loop fashion until all subsets are processed to completion. In one embodiment, the results may then be accumulated together. The batch service module 120 may also retry failed processing of subsets (814). For example, if 300,000 subsets are submitted for processing, there may be a few subsets that have failed, and as such, are submitted to retry failed subsets. Once all the subsets are completed, the batch service module 120 may invoke post-processing, such as, Java functionality processing (816). Hence, for example, in the case of balance sheet collection, the batch service module 120 may be programmed to collect or accumulate values across the balance sheet items, and as such, the post-process may be to store all the accumulated results on the storage device 110. After post-processing, the batch service module 120 may set status as complete (818) and ends the operation (820).

FIG. 10 illustrates an exemplary batch process model 1000, according to an embodiment of the present disclosure. This batch process model 1000 may include the output data accumulated from the operation of the batch process modeling module 114, as illustrated in FIG. 4. The batch process model 1000 may include the name of the batch process and runtime properties. For example, it may include an activity step descriptor with input parameters such as, multi-node operation indicator, number of concurrent threads to use, number of jobs per database transaction, the database statement to select the required data set and contention context data. The batch process model 1000 may also include pre-process execution model, process execution model, post-process execution model and any data items that were accumulated during process execution. In one embodiment, the batch process model 1000 may selectively include some or all of the foregoing data. In one embodiment, the batch process model 1000 may include additional data.

Figure 11:
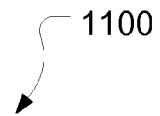
FIG. 11 illustrates an exemplary process execution model, according to an embodiment of the present disclosure.

FIG. 11 illustrates an exemplary process execution model 1100, according to an embodiment of the present disclosure. This process execution model 1100 may include the output data accumulated from the operation of the batch process modeling module 114, as illustrated in FIG. 5. The process execution model 1100 may include a list of activity steps and their order, a list of input and output parameters per activity step, and any mapping rules between activity steps. In one embodiment, the process execution model 1100 may selectively include some or all of the foregoing data. In one embodiment, the process execution model 1100 may include additional data.

FIG. 12 illustrates a graphical user interface 1200 for editing execution logic, according to an embodiment of the present disclosure. In one embodiment, the graphical user interface 1200 may be provided by the batch process modeling module 114 for display on some or all of the computing device 102, the computing device 210, and the computing devices 106. In one embodiment, the graphical user interface 1200 may be provided by the workbench module 112 for display on some or all of the computing device 102, the computing device 210, and the computing devices 106. The graphical user interface 1200 may include a directory of different artefact types 1210, a palette 1220 with a list of objects/images 1230 corresponding to activity steps, and an editing canvas 1240 having a "Start" image 1250, a "End" image 1260, one or more activity steps 1270 coupled via a connector 1280. The graphical user interface 1200 may also include a window 1285 with an outline of the flowchart steps, and a window 1290 with a description of the properties of the flowchart displayed on the editing canvas 1240. As described herein, the graphical user interface 1200 may be appropriately manipulated by a user to create and edit a process execution model. In one embodiment, the graphical user interface 1200 may be manipulated by the user through the use of drag and drop, selecting from a list, or other user input and editing techniques, or any combination thereof.

In one embodiment, as described above, an "activity step", "batch context" or the like may be used to load and distribute parameters of a specific batch process requirement. A "pre-process" may be used to perform any initialization that is required prior to the start of the batch process. A "process" may be used to perform the essential business logic of the requirement and is performed on a subset of the overall data set. Thus, it may be invoked many times, optionally in parallel, depending on the configured subset size and size of the data set. An "accumulator" may be used during the course of process execution. Given the accumulator's inherent parallelism, data may be accumulated for post-processing after all processing of the primary data set has completed. Having processed all subsets, a "post-process" may be used to perform any tidy-up or completion business logic, such as storage of accumulated data. Combined, these components comprise the business logic of a batch process requirement and may be expressed in, for example, a Java programming language.

In one embodiment, the Batch Process Straight Through Modeling may provide the capability in the workbench module 112 to model batch components and to generate the required artefacts for the processor 108 to execute. This permits an application developer to express himself or herself in the form of a batch process model, thus making the use of a programming language unnecessary or redundant. The pre-process, process and post-process components may be defined in the form of a flowchart, while these and the other components have a programming language code generated, without human intervention, by the workbench module 112 to express their specific needs.

Once the batch processing model has been prepared by the application developer, it may be transformed and deployed to a runtime environment for immediate availability and execution.

As discussed above and illustrated in the figures, in one embodiment, the workbench model 112 may transform the batch process model into Java code. References herein to Java code and classes are illustrative only. In one embodiment, the workbench model 112 instead or in addition may transform the batch process model into other programming languages, such as Java, C#, C++, Java Script, or any other programming language that may be deemed appropriate. In one embodiment, the workbench model 112 and the data processing system 100 are not limited to any particular programming language, such as Java.

Figure 13:
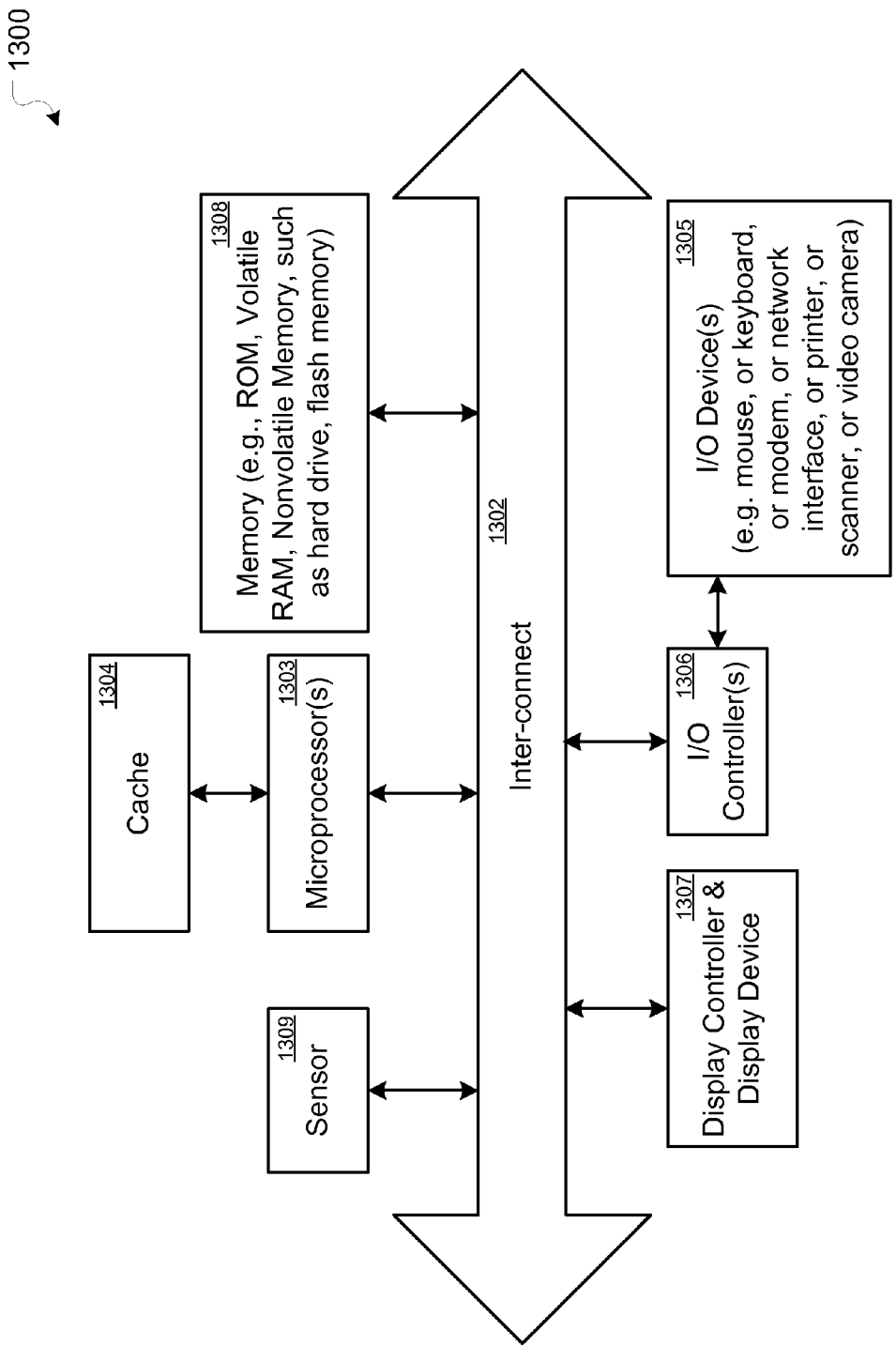
FIG. 13 illustrates an exemplary block diagram of a data processing system that may be used in various embodiments of the present disclosure.

FIG. 13 illustrates an exemplary block diagram of a data processing system 1300 that may be used in various embodiments of the present disclosure. Accordingly, FIG. 13 shows a data processing system (or machine) in an exemplary form of a computer system that may be used to implement the computers, servers, or server farm, including their features and functions, as described herein. While FIG. 13 illustrates various components of a computer system, it is not intended to represent any particular architecture or manner of interconnecting the components. Some embodiments may use other systems that have fewer or more components than those shown in FIG. 13.

In one embodiment, the data processing system may be connected (e.g., networked) to other data processing systems. In a networked deployment, the data processing system may operate in the capacity of a server computer in a client-server network environment. In one embodiment, the data processing system may communicate with a client computer to facilitate operations of the client computer and/or to allow the client computer to access the operations of the server computer.

In FIG. 13, the data processing system 1301 of a user terminal includes an inter-connect 1302 (e.g., bus and system core logic), which interconnects a microprocessor(s) 1303 and memory 1308. The microprocessor 1303 is coupled to cache memory 1304 in the example of FIG. 13.

The inter-connect 1302 interconnects the microprocessor(s) 1303 and the memory 1308 together and also interconnects them to a display controller, display device 1307, the sensor 1309, and to peripheral devices such as input/output (I/O) devices 1305 through an input/output controller(s) 1306.

The sensor 1309 may include an accelerometer to determine the orientation of the user terminal and/or to detect shaking.

Typical I/O devices include mice, keyboards, modems, network interfaces, printers, scanners, video cameras, and other devices, which are well known in the art. In some embodiments, when the data processing system is a server system, some of the I/O devices, such as printer, scanner, mice, and/or keyboards, are optional.

The inter-connect 1302 may include one or more buses connected to one another through various bridges, controllers, and/or adapters. In one embodiment the I/O controller 1306 includes a USB (Universal Serial Bus) adapter for controlling USB peripherals, and/or an IEEE-1394 bus adapter for controlling IEEE-1394 peripherals.

The memory 1308 may include ROM (Read Only Memory), volatile RAM (Random Access Memory), and non-volatile memory, such as hard drive, flash memory, etc.

Figure 14:
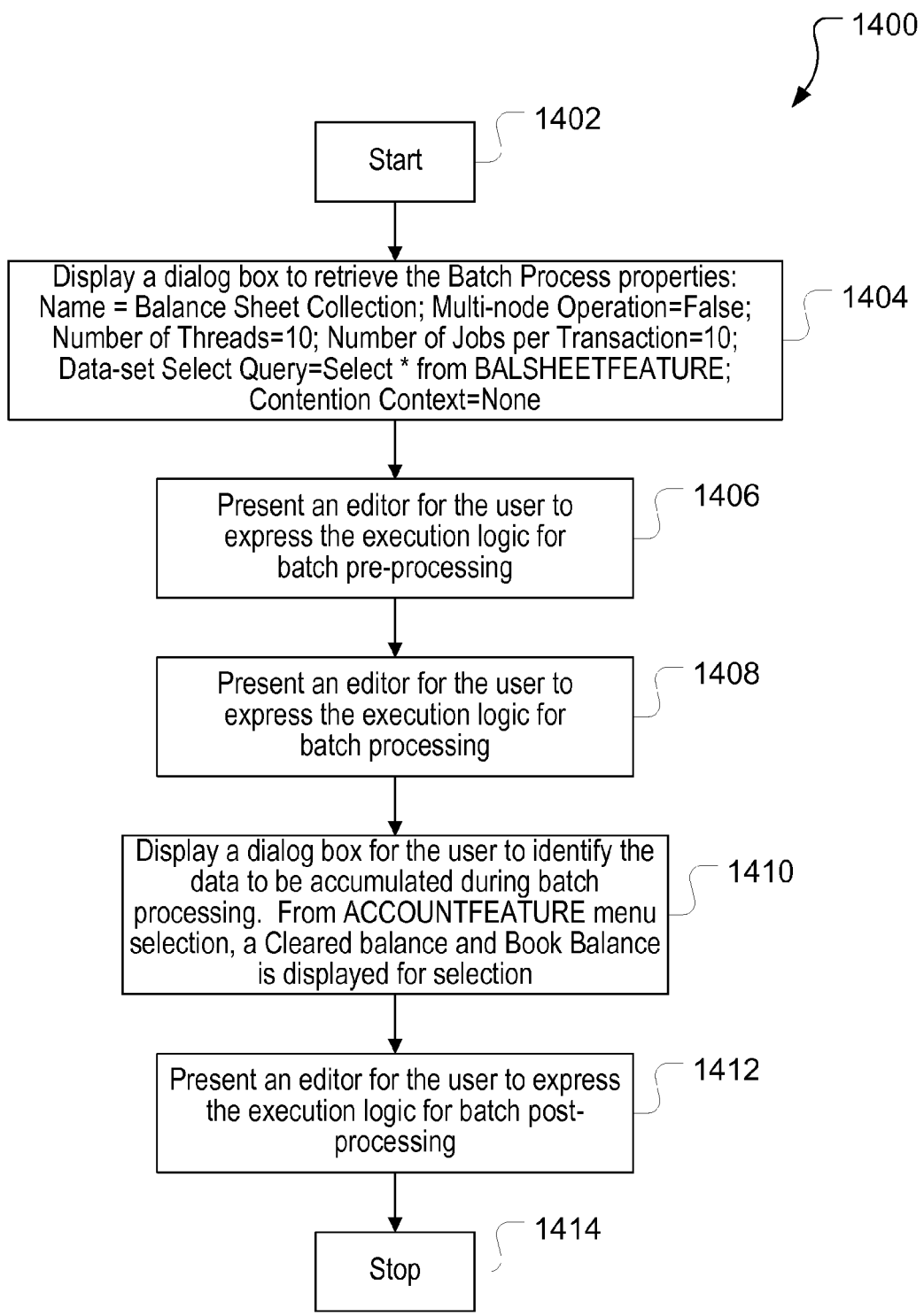
FIG. 14 illustrates an exemplary flowchart outlining the operation of the batch process modeling module to model balance sheet collection, according to an embodiment of the present disclosure.

FIG. 14 illustrates an exemplary flowchart 1400 outlining the operation of the batch process modeling module 114 to model balance sheet collection, according to an embodiment of the present disclosure. Balance Sheet Collection may include the accumulation of balance data across a bank's account base against individual Balance Sheet line items. Line items may be items that appear under the Assets and Liabilities columns of a Balance Sheet. The batch process modeling module 114 may initiate (1402) batch process modeling and display a dialog box to retrieve the Batch Process properties (1404). The properties may include, for example, Name=Balance Sheet Collection, Multi-node Operation=False, Number of Threads=10, Number of Jobs per Transaction=10, Data-set Select Query=Select * from BALSHEETFEATURE, and Contention Context=None. Next, the batch process modeling module 114 may present an editor for the user to express the execution logic for batch pre-processing (1404) and batch processing (1408).

A dialog box may then be displayed for the user to identify the data to be accumulated during batch processing (1410).

From an ACCOUNTFEATURE menu selection, a Cleared balance and Book Balance is displayed for selection. Next, the batch process modeling module 114 may be programmed to present an editor for the user to express the execution logic for batch post-processing (1412). At this point, the batch process modeling is complete (1414). The model may then be stored in the storage device 110.

Figure 15:
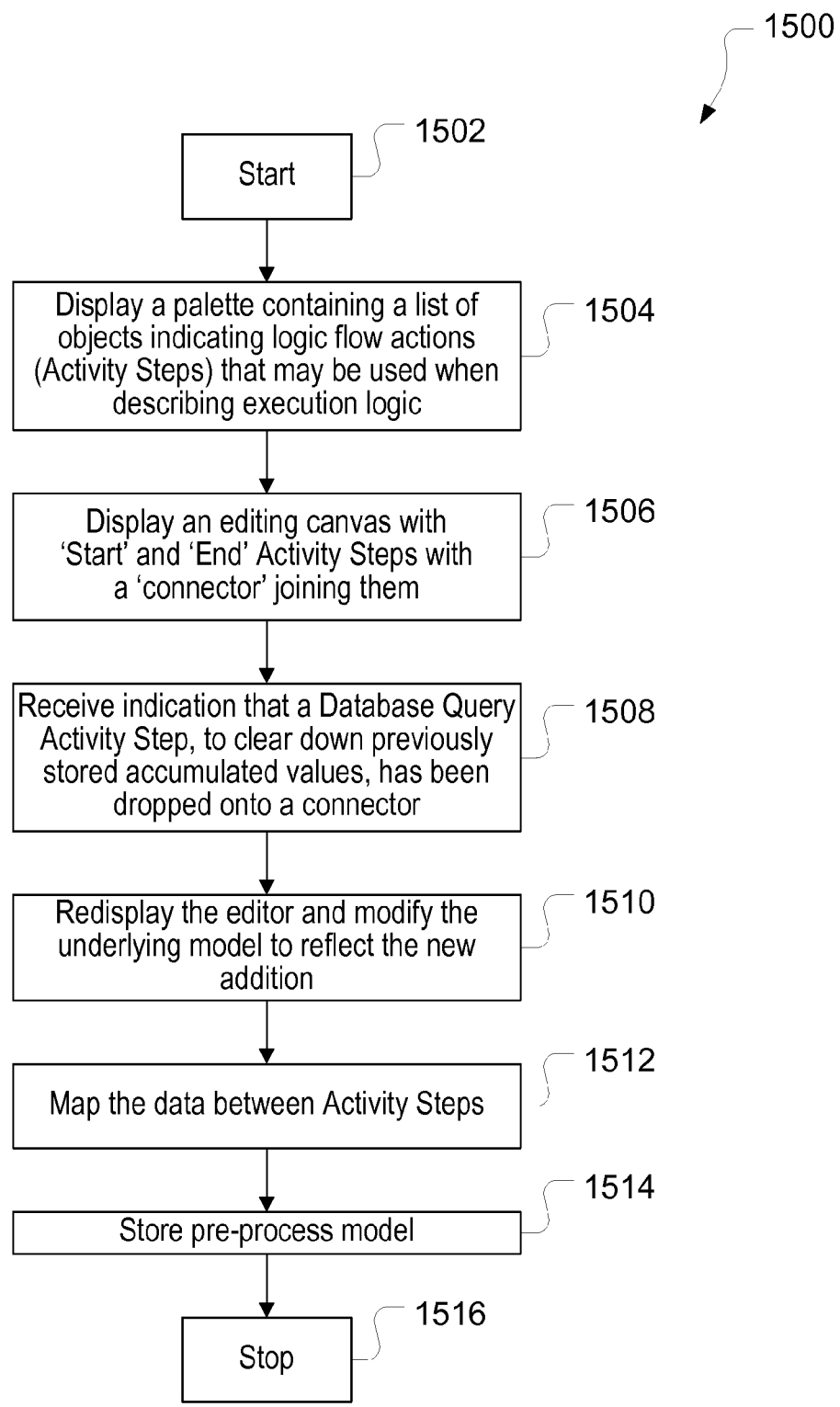
FIG. 15 illustrates an exemplary flowchart outlining the operation of the batch process modeling module for editing execution logic of batch pre-processing in the example of FIG. 14, according to an embodiment of the present disclosure.

FIG. 15 illustrates an exemplary flowchart 1500 outlining the operation of the batch process modeling module 114 for editing execution logic of batch pre-processing in the example of FIG. 14, according to an embodiment of the present disclosure. The batch process modeling module 114 may provide a graphical user interface, such as the editor illustrated in FIG. 12, that starts (1502) the editing of execution logic by displaying a palette containing a list of images/objects (1504). Each image/object may correspond to logic flow actions (activity steps) that may be used when describing execution logic. Next, the graphical user interface may display an editing canvas with "Start" and "End" activity steps with a connector joining them (1506). The batch process modeling module 114 may receive an indication that a Database Query Activity Step, which clears down previously stored accumulated values, has been dragged and dropped onto a connector (1508). Next, the batch process modeling module 114 may redisplay the editor and modify the underlying model to reflect any newly added activity steps (1510). The batch process modeling module 114 may map the data between activity steps (1512), store the execution model (1514) and ends the operation (1516).

Figure 16:
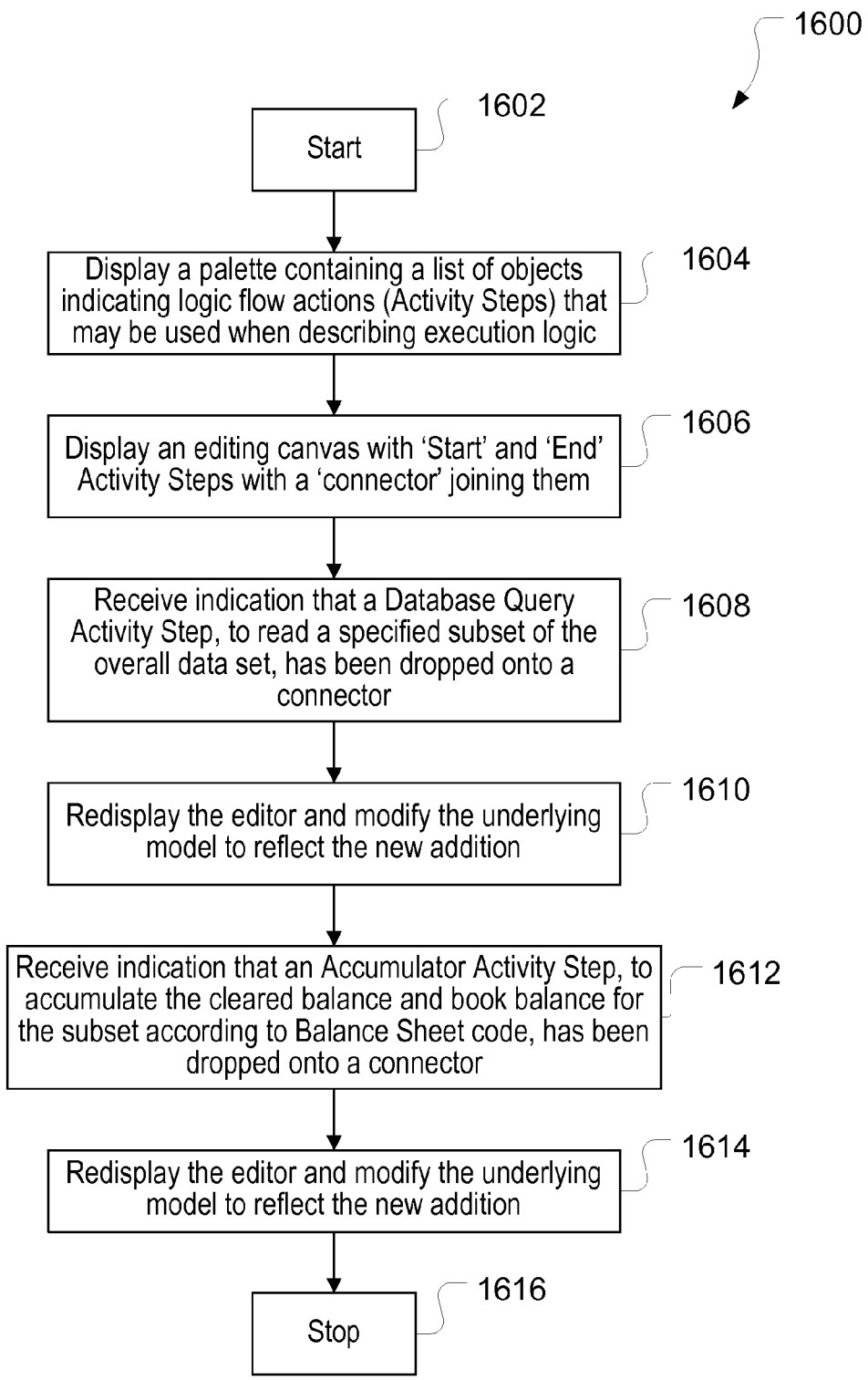
FIG. 16 illustrates an exemplary flowchart outlining the operation of the batch process modeling module for editing execution logic of batch processing in the example of FIG. 14, according to an embodiment of the present disclosure.

FIG. 16 illustrates an exemplary flowchart 1600 outlining the operation of the batch process modeling module 114 for editing execution logic of batch processing in the example of FIG. 14, according to an embodiment of the present disclosure. The batch process modeling module 114 may provide a graphical user interface, such as the editor illustrated in FIG. 12, that starts (1602) the editing of execution logic by displaying a palette containing a list of images/objects (1604). Each image/object may correspond to logic flow actions (activity steps) that may be used when describing execution logic. Next, the graphical user interface may display an editing canvas with "Start" and "End" activity steps with a connector joining them (1606). The batch process modeling module 114 may receive an indication that a Database Query Activity Step, which clears down previously stored accumulated values, has been dragged and dropped onto a connector (1608). Next, the batch process modeling module 114 may redisplay the editor and modify the underlying model to reflect any newly added activity steps (1610). The batch process modeling module 114 may also receive an indication that an Accumulator Activity Step, which accumulates the cleared balance and book balance for the subset according to Balance Sheet code, has been dragged and dropped onto a connector (1612). Next, the batch process modeling module 114 may redisplay the editor and modify the underlying model to reflect any newly added activity steps (1614) and end the operation (1616).

Figure 17:
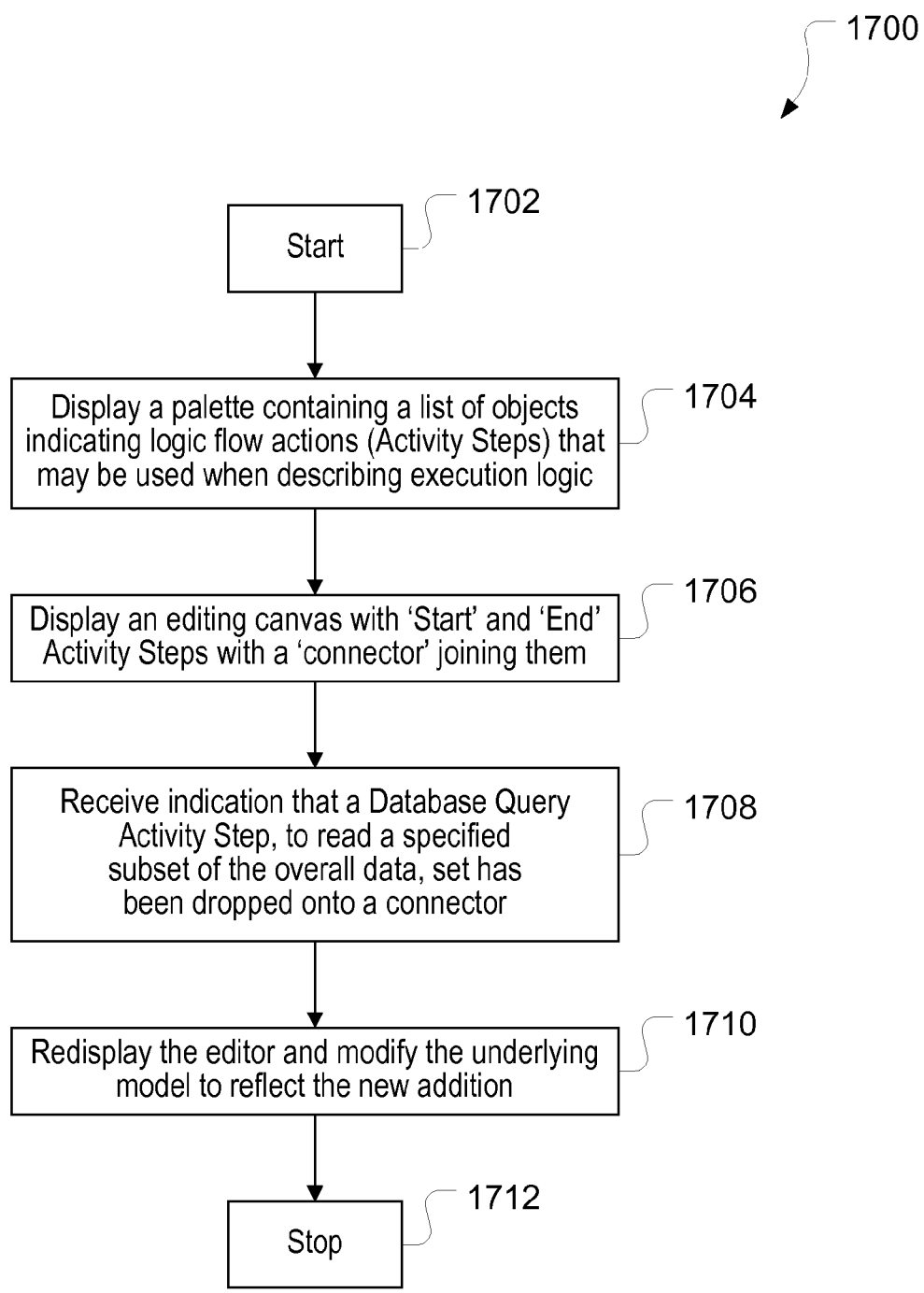
FIG. 17 illustrates an exemplary flowchart outlining the operation of the batch process modeling module for editing execution logic of batch post-processing in the example of FIG. 14, according to an embodiment of the present disclosure.

FIG. 17 illustrates an exemplary flowchart 1700 outlining the operation of the batch process modeling module 114 for editing execution logic of batch post-processing in the example of FIG. 14, according to an embodiment of the present disclosure. The batch process modeling module 114 may provide a graphical user interface, such as the editor illustrated in FIG. 12, that starts (1702) the editing of execution logic by displaying a palette containing a list of images/objects (1704). Each image/object may correspond to logic flow actions (activity steps) that may be used when describing execution logic. Next, the graphical user interface may display an editing canvas with "Start" and "End" activity steps with a connector joining them (1706). The batch process modeling module 114 may receive an indication that a Database Query Activity Step, which updates the database by a balance sheet line item with the accumulated values, has been dragged and dropped onto a connector (1708). Next, the batch process modeling module 114 may redisplay the editor and modify the underlying model to reflect any newly added activity steps (1710) and end the operation (1712).

The foregoing is merely an example with respect to balance sheet collection. As set forth above, the present invention may be applied to model a variety of other functional batch service areas.

In the foregoing specification and the following appended documents, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

In this description, use of the term "include" or the like herein means an inclusive listing, rather than an exclusive listing, that may contain items in addition to or instead of those expressly identified.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs". The computer programs typically include one or more instructions set at various times in various memory and storage devices in a computer, and that when read and executed by one or more processors in a computer, cause the computer to perform operations necessary to execute elements involving the various aspects.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

A machine readable medium also can be used to store software and data, which, when executed by a data processing system causes the system to perform various methods. The executable software and data may be stored in various places, including, for example, ROM, volatile RAM, non-volatile memory, and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions, or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Volatile RAM is typically implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory may also be a random access memory. The non-volatile memory can be a local device coupled directly to the rest of the components in the data processing system. A non-volatile memory that is remote from the system, such as a network storage device coupled to the data processing system through a network interface such as a modem or Ethernet interface, can also be used.

Examples of computer readable media include, but are not limited to, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

The computer readable media may store the instructions. In general, a tangible machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The disclosure includes methods and apparatuses that perform these methods, including data processing systems, which perform these methods, and computer readable media containing instructions, which when executed on data processing systems, cause the systems to perform these methods.

While the methods and systems have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

It should also be understood that a variety of changes may be made without departing from the essence of the invention. Such changes are also implicitly included in the description. They still fall within the scope of this invention. It should be understood that this disclosure is intended to yield a patent covering numerous aspects of the invention, both independently and as an overall system, and in both method and apparatus modes.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these.

In this regard it should be understood that for practical reasons, and so as to avoid adding potentially hundreds of claims, the applicant has presented claims with initial dependencies only.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The invention claimed is:

1. A non-transitory computer readable medium having stored thereon a set of instructions, which when executed by a computing system having a processor and a memory, cause the computing system to perform operations, comprising:
   providing for display a graphical user interface for graphically defining and displaying a batch process model with at least one flowchart including a pre-process flowchart for batch pre-processing, a process flowchart for batch processing, and a post-process flowchart for batch post-processing, wherein the interface allows defining of batch process properties including a number of multi-nodes, a number of concurrent threads, and a number of jobs per database transaction;
   receiving a selection of at least one activity step for inclusion in the at least one flowchart, the at least one activity step corresponding to a predefined execution logic;
   defining the batch process model based on the at least one activity step, the batch process model transformable for execution without a need for manual programming;
   receiving, through the interface, at least one definition of a batch process property that corresponds to at least one of the number of multi-nodes, the number of concurrent threads, and the number of jobs per database transaction;

transforming the batch process model into an executable code based at least in part on the at least one definition of the batch process property;

retrieving batch data from a storage device;

dividing the batch data into a plurality of subset data for processing; and executing, in parallel, the executable code of the batch process model on a plurality of processor threads, each processor thread processing one of the plurality of subset data.

2. The non-transitory computer readable medium of claim 1, further comprising:

providing for display in the at least one flowchart the at least one activity step, the pre-process flowchart for batch pre-processing, the process flowchart for batch processing, and the post-process flowchart for batch post-processing.

3. The non-transitory computer readable medium of claim 1, further comprising:

displaying a palette having an image associated with each of the least one activity step prior to the receiving a selection of the at least one activity step for inclusion in the at least one flowchart.

4. The non-transitory computer readable medium of claim 1, wherein the batch process model is associated with balance sheet collection.

5. The non-transitory computer readable medium of claim 1, wherein the batch process model is based on batch process component artefacts retrievable in at least one of original form and executable form.

6. The non-transitory computer readable medium of claim 1, further comprising:

displaying a connector in the at least one flowchart to connect a first activity step from the at least one activity step to a second activity step from the at least one activity step.

7. The non-transitory computer readable medium of claim 1, wherein the graphical user interface includes a directory of artefact types, a palette with a list of objects corresponding to a plurality of the at least one activity step, and an editing canvas having the plurality of the at least one activity step coupled via connectors.

8. A method comprising:

providing, by a computing system, for display a graphical user interface for graphically defining and displaying a batch process model with at least one flowchart including a pre-process flowchart for batch pre-processing, a process flowchart for batch processing, and a post-process flowchart for batch post-processing, wherein the interface allows defining of batch process properties including a number of multi-nodes, a number of concurrent threads, and a number of jobs per database transaction;

receiving, by the computing system, a selection of at least one activity step for inclusion in the at least one flowchart, the at least one activity step corresponding to a predefined execution logic;

defining, by the computing system, the batch process model based on the at least one activity step, the batch process model transformable for execution without a need for manual programming;

receiving, through the interface, at least one definition of a batch process property that corresponds to at least one of the number of multi-nodes, the number of concurrent threads, and the number of jobs per database transaction;

transforming the batch process model into an executable code based at least in part on the at least one definition of the batch process property;

retrieving batch data from a storage device;

dividing the batch data into a plurality of subset data for processing; and executing, in parallel, the executable code of the batch process model on a plurality of processor threads, each processor thread processing one of the plurality of subset data.

9. The method of claim 8, further comprising:

providing for display in the at least one flowchart the at least one activity step, the pre-process flowchart for batch pre-processing, the process flowchart for batch processing, and the post-process flowchart for batch post-processing.

10. The method of claim 8, further comprising:

displaying a palette having an image associated with each of the least one activity step prior to the receiving a selection of the at least one activity step for inclusion in the at least one flowchart.

11. A system comprising:

at least one processor; and a memory storing instructions that, when executed by the at least one processor, cause the system to perform:

providing for display a graphical user interface for graphically defining and displaying a batch process model with at least one flowchart including a pre-process flowchart for batch pre-processing, a process flowchart for batch processing, and a post-process flowchart for batch post-processing, wherein the interface allows defining of batch process properties including a number of multi-nodes, a number of concurrent threads, and a number of jobs per database transaction;

receiving a selection of at least one activity step for inclusion in the at least one flowchart, the at least one activity step corresponding to a predefined execution logic;

defining the batch process model based on the at least one activity step, the batch process model transformable for execution without a need for manual programming;

receiving, through the interface, at least one definition of a batch process property that corresponds to at least one of the number of multi-nodes, the number of concurrent threads, and the number of jobs per database transaction;

transforming the batch process model into an executable code based at least in part on the at least one definition of the batch process property;

retrieving batch data from a storage device;

dividing the batch data into a plurality of subset data for processing; and executing, in parallel, the executable code of the batch process model on a plurality of processor threads, each processor thread processing one of the plurality of subset data.

12. The system of claim 11, further comprising:

providing for display in the at least one flowchart the at least one activity step, the pre-process flowchart for batch pre-processing, the process flowchart for batch processing, and the post-process flowchart for batch post-processing.

13. The system of claim 11, further comprising:

displaying a palette having an image associated with each of the least one activity step prior to the receiving a selection of the at least one activity step for inclusion in the at least one flowchart.

* * * * *